United States Patent
Jilken

(10) Patent No.: US 9,120,273 B2
(45) Date of Patent: Sep. 1, 2015

(54) METHOD TO RECREATE THE SURFACE OF AN AGED AND DETERIORATED FIBRE-REINFORCED PLASTIC FACING MATERIAL

(76) Inventor: Leif Anders Jilken, Kalmar (SE)

(*) Notice: Subject to any disclaimer, the term of this patent is extended or adjusted under 35 U.S.C. 154(b) by 624 days.

(21) Appl. No.: 13/394,472

(22) PCT Filed: Sep. 10, 2010

(86) PCT No.: PCT/SE2010/000219
§ 371 (c)(1),
(2), (4) Date: May 7, 2012

(87) PCT Pub. No.: WO2011/031202
PCT Pub. Date: Mar. 17, 2011

(65) Prior Publication Data
US 2012/0219723 A1    Aug. 30, 2012

(30) Foreign Application Priority Data
Sep. 10, 2009  (SE) .................................... 0901171-9

(51) Int. Cl.
*C23C 14/30*   (2006.01)
*H05B 7/00*    (2006.01)
(Continued)

(52) U.S. Cl.
CPC . *B29C 73/34* (2013.01); *B29B 9/14* (2013.01); *B29C 2035/0822* (2013.01)

(58) Field of Classification Search
CPC .................... B29C 73/34; B29C 2035/0822
USPC ......... 264/446, 480, 481, 493, 36.1; 427/140, 427/596
See application file for complete search history.

(56) References Cited

U.S. PATENT DOCUMENTS 5,910,267 A * 6/1999 Stricker ........................ 219/548
2002/0018907 A1   2/2002 Zehner
(Continued)

FOREIGN PATENT DOCUMENTS

DE     4209522 A1 *  9/1993
DE     4242812 A1    6/1994
(Continued)

OTHER PUBLICATIONS

Machine translation of DE4209522 A1.*
(Continued)

*Primary Examiner* — Michael Wieczorek
(74) *Attorney, Agent, or Firm* — Perkins Coie LLP

(57) ABSTRACT

The present invention relates to a method and a device to improve an aged surface layer (7) of a boarding material (1) to an essentially "newly painted condition", which boarding material (1) is manufactured from essentially recovered, ground down polymer material (3) and ground down organic fiber (4) having a surface layer (2) which, after a certain time, has been exposed to UV light, weather and wind, cold and heat, and has caused the polymer material (3) to be removed to some extent and to create an aged surface layer (7), which according to the invention is restored indifferent steps. In a first step loose particles are removed from the aged surface layer (7), and in a second step this layer is heated to 160-200 degrees C. by a heating device (8) until the organic fiber (4) has sucked in, by capillary suction, the fluid polymer material (3) containing dye pigment lying underneath the aged surface layer (7), which thereafter is improved to an essentially new condition.

8 Claims, 3 Drawing Sheets

Figure 1:
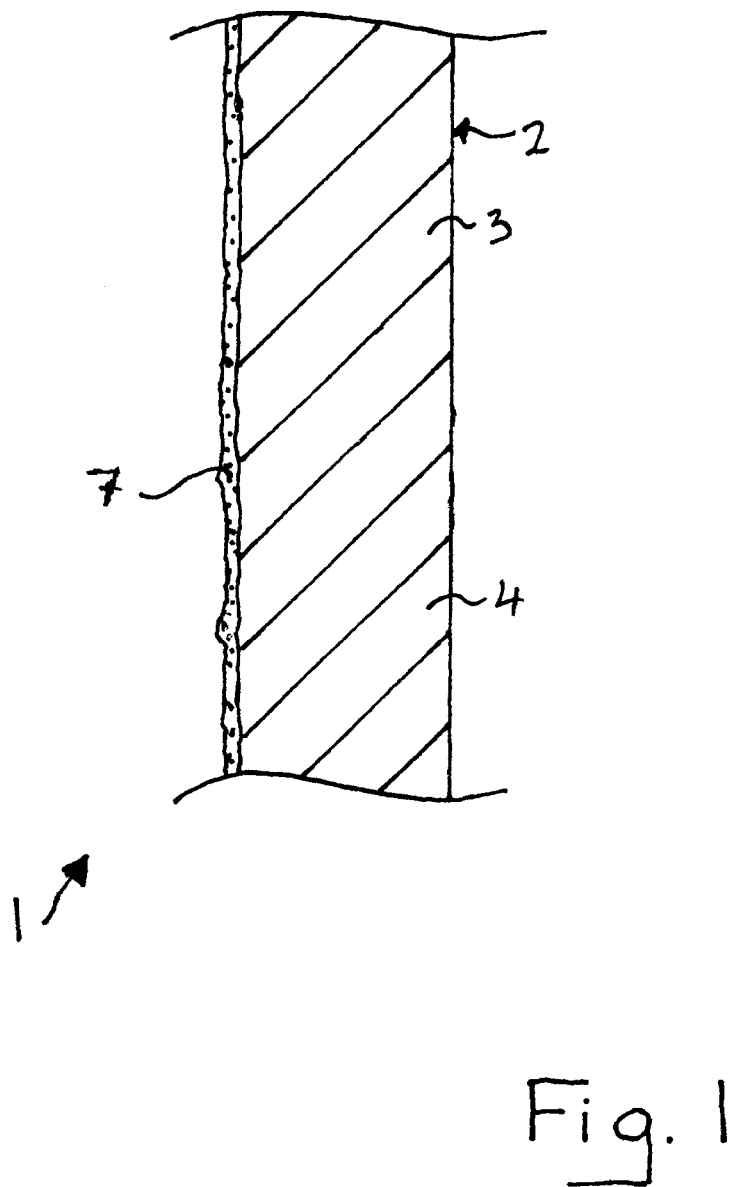

(51) Int. Cl.
    *B29C 59/16*   (2006.01)
    *B29C 73/34*   (2006.01)
    *B29B 9/14*    (2006.01)
    *B29C 35/08*    (2006.01)

(56) References Cited

U.S. PATENT DOCUMENTS

2005/0116368 A1   6/2005   Nowak
2006/0037955 A1   2/2006   Gueugnaut et al.
2006/0208387 A1   9/2006   Zodl

FOREIGN PATENT DOCUMENTS

| | | |
|---|---|---|
| JP | 2000198146 A | 7/2000 |
| JP | 2007119125 A | 5/2007 |
| WO | 2009082350 A2 | 7/2009 |

OTHER PUBLICATIONS

International Search Report re PCT/SE2010/000219, mailed Oct. 28, 2010.

* cited by examiner

METHOD TO RECREATE THE SURFACE OF AN AGED AND DETERIORATED FIBRE-REINFORCED PLASTIC FACING MATERIAL

The present invention relates to a method and a device to improve an aged surface layer of a boarding material, which is manufactured from recovered, ground down polymer material and ground down organic fibre that have been mixed together and then melted together under heat with dye pigment, and finally extruded through a nozzle or tool to create the aforementioned boarding material.

In structures of the type in question available on the market painting is mainly used nowadays as a method of improving an aged, crackled, broken down surface layer in a boarding material, e.g. a facade, a wall, a roof, a fence or a part. Painting a surface involves considerable environmental pollution. Decorator's paint contains approx. 50 percent pigment and 50 percent barrier in the form of solvent, which consists of environmentally harmful tins, varnish naphtha etc., which also discharge hazardous gases which cause physical injuries to people who inhale the gases, particularly those who paint. Large quantities of paint are consumed to meet the need for newly painted surfaces each year, which causes enormous environmental damage. Moreover, decorator's paint is expensive and time-consuming to produce, transport and apply to the surface. Furthermore, the painting process is sticky and therefore continuously requires new work clothes. Moreover, paint residues and paint tins, brushes and other packaging materials left behind are expensive and environmentally harmful to destroy. A newly painted surface has limited life and must therefore be repainted at short intervals, and each time this involves a recurring, new environmental load. The painting process as a whole causes a major, serious environmental problem. Boarding material which has been manufactured from recovered, ground down polymer material and ground down organic fibre, which have been melted together under heat with dye pigment, then extrude through a nozzle or tool to form the boarding material, is subject to the problems described above if it is painted to renew its aged surface layer. Moreover, the painting does not provide the boarding material with a strengthening surface layer.

One objective of the present invention is to eliminate the drawbacks suffered by boarding material manufactured from recovered, ground down polymer material and ground down organic fibre which has been melted together under heat with dye pigment and which has then been extruded through a nozzle or tool to form a boarding material having a surface layer, by improving an aged surface layer of the boarding material by heating this with a heating device according to the invention where polymer material, organic fibre and dye pigment incorporated in the boarding material have been melted together in the surface layer over a larger surface, which has then been restored.

Thanks to the invention a method and a device have now been provided which enable the aged surface layer of a boarding material to be improved to an essentially "newly painted condition" simply, cheaply and in an environmentally friendly manner. The boarding material to be improved is used, for example, as a board material in a wall, in a roof or boards in a fence. This boarding material is manufactured mainly from recovered, ground down polymer material which has been mixed together in a container with ground down organic fibre, consisting of wood fibres and/or cellulose fibres which, at a temperature of approx. 150 degrees C., are moistened, agitated, processed and finely divided to form a quantity of essentially moistened granulates having a diameter or a cross-sectional dimension of approx. 1-3 mm. The ground down organic fibre contains, in each granulate, a multiplicity of very short tubular formations, which have a diameter of approx. 1-50 thousandths of a millimeter and a length up to some millimeter. These granulates are kept down in an extruder, where they are screwed into it under high pressure together with the dye pigment to form a mixture, which then becomes increasingly fluid when heated to a temperature of approx. 200° C., during which a capillary force in and around the tubular formations in the mixture suck the fluid polymer material into and around the tubular formations. The fluid mixture is then extruded out through a nozzle or tool where, during cooling, it forms the boarding material. In the finished condition the boarding material then displays a surface layer which has a wooden structure characterized by the organic fibres. When the boarding material is used outside, a new surface layer is aged after a shorter or longer period when it has been exposed to UV light, weather and wind, cold and heat. This means that the polymer material and dye pigment in and around the tubular formations have to some extent been removed or broken down in the aged surface layer and parts of the dye pigment have disappeared.

According to the invention the aged surface layer is restored to a new layer according to a method consisting of different steps. In a first step essentially all loose parties, e.g. dirt, dust, soot and broken down, loose polymer material, are removed from the aged surface layer which, after this, then has some bear, empty tubular formations of the organic fibres, which have no dye pigment and polymer material in and around them. The remaining surface layer is then heated in a second step to 160-200 degrees C. by a heating device until said tubular formations in and around them have sucked in and have been filled with the fluid polymer material by means of capillary suction, which polymer material contains the dye pigment from points located underneath and around the aged surface layer. The tubular formations then constitute a strengthening reinforcement around the polymer material which together form a new, strong, wood-like surface layer, which has then been restored essentially to the new condition, having a shade of colour corresponding to the original surface layer of the boarding material.

In the second step approx. two thirds of the weight of the mixture consist of the polymer material and approx. one third of the weight of the mixture consists of the organic fibres. In this proportional distribution the polymer material then suffices to fill practically all the tubular formations of the fibres and areas around them with the polymer material, and all the tubular formations and areas around them are therefore filled essentially with the polymer material which, together with the tubular formations, act as the aforementioned reinforcement, which then provides the boarding material with optimum strength in terms of bending and tensile strength, and high flexural stiffness and the dye pigment then constitutes approx. 2-3 percent by weight of the mixture to give a saturated, even dye distribution throughout the boarding material.

The most significant advantages of the invention are therefore that a highly environmentally friendly, simple, cheap, quickly executed method has been developed by aid of a heating device having at least twice the surfaces of extension in order to improve in a convenient manner the surface layer over a larger desired surface to constitute an essentially new condition, without brushes, environmentally harmful solvent, without sticking and hence without having constantly to wear new work clothes. The enormous environmental loading of painting is therefore avoided and the correct shade and wood-like surface layer are always automatically obtained by the method according to the invention over a desired proportion of the restored surface at the same time as the surface layer of the boarding material therefore has great strength in terms of stiffness, bending and tensile strength after the method has been implemented.

Figure 2:
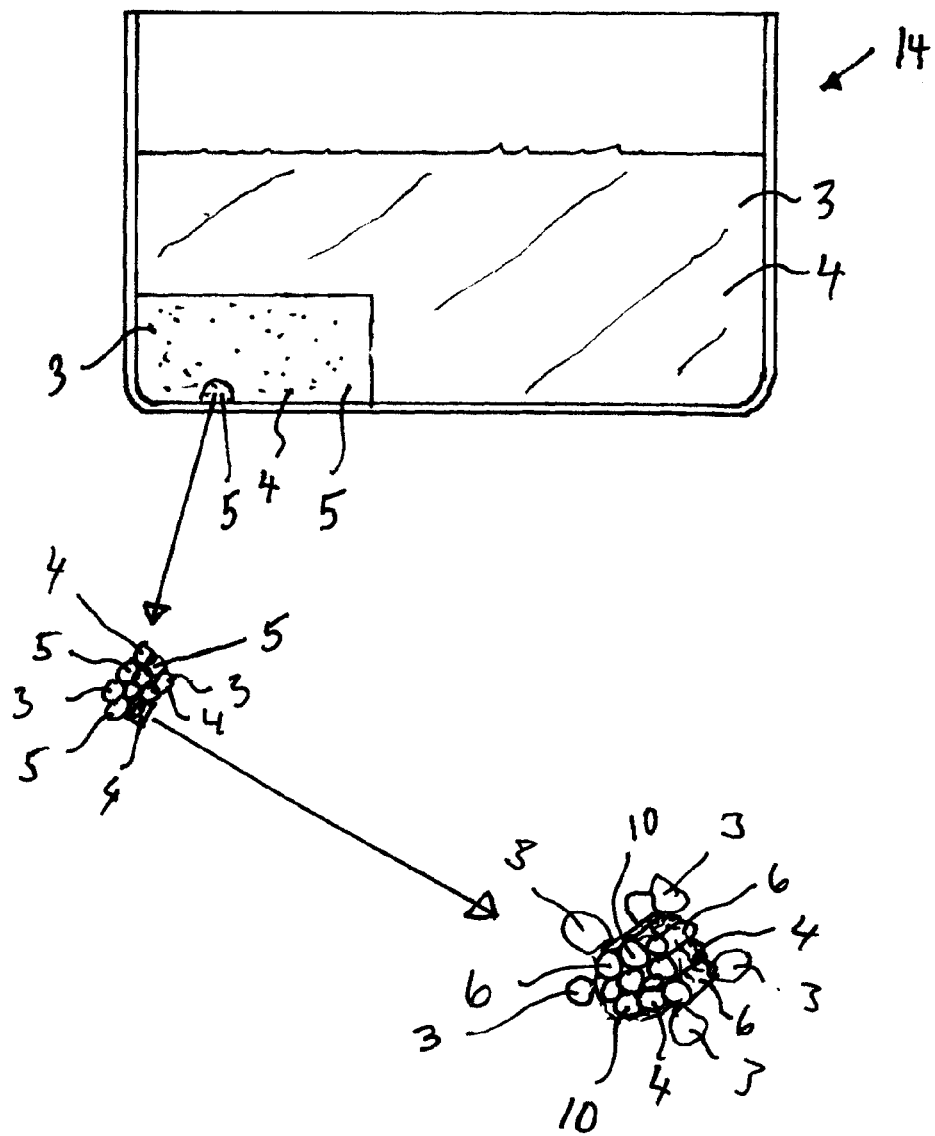
Figure 3:
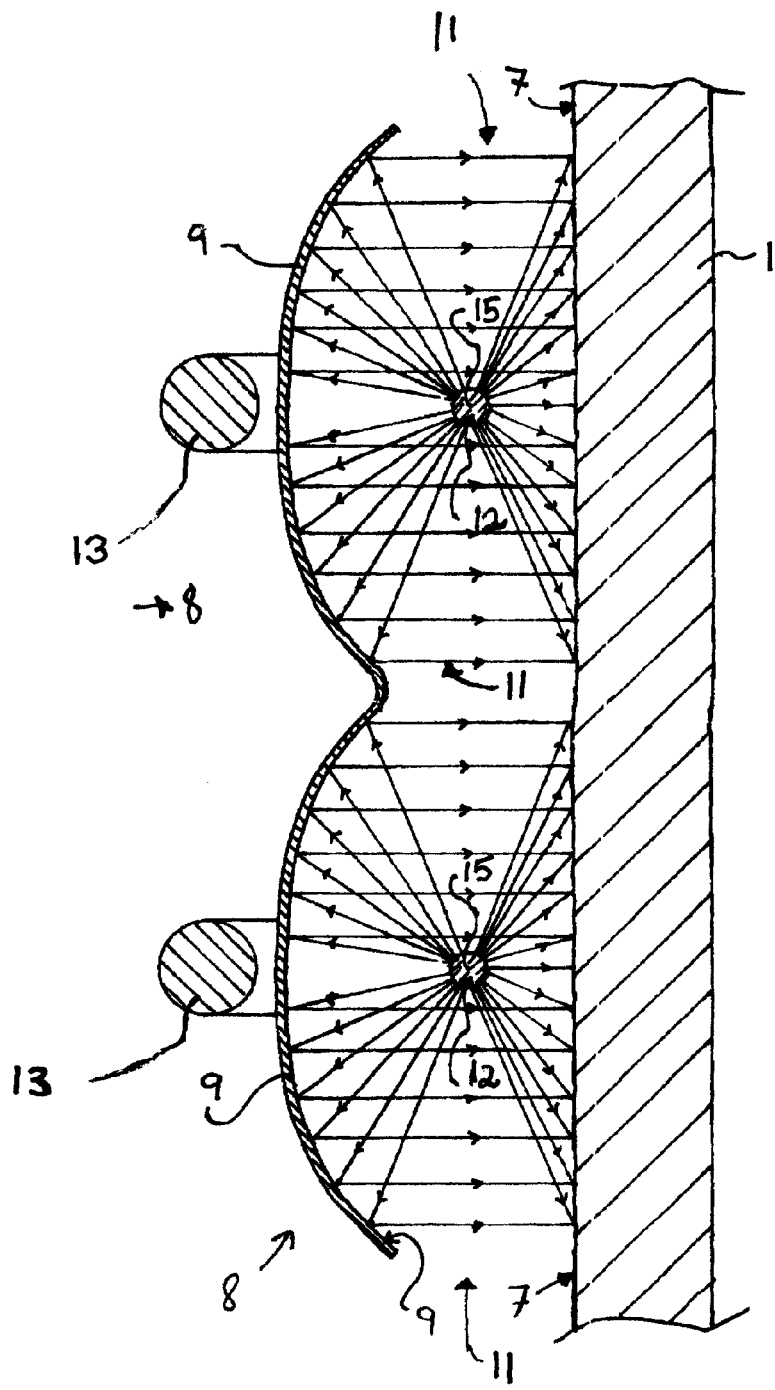

The invention is described more in detail below by means of a preferred embodiment example with reference to the attached drawings, in which FIG. 1 shows a vertical cross-section through a boarding material manufactured from recovered, ground down polymer material and ground down organic fibres, which has an aged surface layer and an uninfluenced surface layer, FIG. 2 shows a container where recovered, ground down polymer material and ground down organic fibres are mixed together and processed into granulate, a proportion of which granulate is shown highly magnified, a number of tubular formations of fibres being visible, and FIG. 3 shows a heating device according to the invention, which heats an aged surface layer to improve it.

FIGS. 1 and 2 show a boarding material 1, which has an uninfluenced surface layer 2 and an aged surface layer 7. The boarding material 1 is manufactured from recovered, ground down polymer material 3 and ground down organic fibres 4, which have been mixed together and processed to form a quantity of granulates 5 in a container 14. The granulates 5 have a diameter or a cross-sectional dimension of approx. 1-3 mm. Each granulate 5 has a multiplicity of very short tubular fibre-formations 6, which have a diameter of approx. 1-50 thousands of a millimeter and a length of some mm upwards. The granulates 5, together with the dye pigment, are fed into an extruder and then screwed inside the extruder under pressure through a nozzle or tool and are then, during cooling, formed into the boarding material 1, having a surface layer 2, which has a wooden structure characterized by the organic fibres 4. The processing into granulates 5 proceeds so that when the polymer material 3 and the organic fibres 4 are mixed together, they are squeezed out of container 14 and are directed at random at a surface in the coils of coils, whereupon this is allowed to dry and to some extent harden there in that form, as bent curves near and on each other, whereupon these are split into granulates 5 in a mill, for example, to form short cylindrical pieces which are approx. 3 mm in diameter and approx. 3 mm long, and which, individually, have a large number of tubular formations 6 of fibres lying close against each other, forming the granulates 5, said tubular formations 6 have openings 10 which are exposed to the generating surfaces and ends of the cylindrical pieces. In this position the openings 10 suck up the fluid polymer material 3 and the dye pigment quickly and effectively when they are fed forward into the extruder, when tubular formations 6 are filled to the maximum.

FIG. 3 shows a heating device 8, which in a third step discharges energy in the form of IR beams 11, which are created by two electrical coils 12 arranged near the heating device 8, said coils are supplied with current, the IR beams 11 being directed with an evenly distributed quantity of energy per unit of area in a direction directly towards the aged surface layer 7, and indirectly via two reflecting reflectors 9 arranged there behind the electrical coils 12, said reflectors direct the reflected IR beams 11 in a direction straight towards the aged surface layer 7. The reflectors 9 are guided in the second step with movements at a distance of approx. 1-5 cm from the aged surface layer 7 to complete the second step. The reflectors 9 have parabolically bent surfaces of extension, where electrical coils 12 are arranged at a distance from reflectors 9 at their focal point 15, each of said reflectors 9 has a handle or fastening element 13, which enable a person or robot arm to grip and perform the movement with the heating device 8 in the aforementioned second step. The reflectors 9 have long and narrow surfaces of extension where the electrical coils 12 extend in parallel with the long sides of the reflectors 9, since each reflector 9 is long and narrow to ensure that IR beams 11 do not travel too long a distance towards the edge area of the reflector 9 before being reflected against the aged surface layer 7. This is to reduce the risk that the reflection may become too oblique relative to the aged surface layer 7, which may cause a lower power per unit of area to be then directed against the aged surface layer 7 in this area. This provides evenly distributed heating over the surface layer 2 extended over a larger area.

The invention claimed is:

1. A method of restoring an aged surface layer of a boarding material, the boarding material being manufactured from recovered, ground down polymer material and ground down organic fibre, which have been melted under heat together with dye pigment and which have then been processed into a quantity of granulates, which have a diameter or a cross-sectional dimension of approximately 1-3 mm, said organic fibre consists of wood or cellulose fibre and comprises, in each granulate, a multiplicity of tubular formations, said granulates together with a dye pigment have been fed into an extruder and then screwed inside it under pressure, wherein the recovered, ground down polymer material that has been processed has over time become a fluid polymer material in that the fluid polymer material is increasingly fluid at a temperature of approximately 200 degrees C., so that the fluid polymer material has been sucked, by capillary force in and around the tubular formations into them to form a fluid mixture, which has then been extruded out through a nozzle or tool, where, during cooling, it has been formed into the aforementioned boarding material, which has a surface layer with a wooden structure characterized by the organic fibres, and said surface layer, of the boarding material having been exposed to UV light, weather and wind, cold and heat, has caused the polymer material and the dye pigment in and around its tubular formations has disappeared and created an aged surface layer, wherein in a first step of the method the aged surface layer is released from loose particles and broken down, loose polymer material, and that in a second step the aged surface layer is heated to approximately 160-200 degrees C. by a heating device until the tubular formations in and around them have sucked in, by capillary suction and been filled with the fluid polymer material containing the dye pigment from points which lie underneath the aged surface layer, whereupon the tubular formations form a strengthening reinforcement around the polymer material, which together recreate a restored surface layer in place of the aged surface layer removed.

2. A method according to claim 1, wherein in the second step approximately two thirds of the weight of a mixture consists of the polymer material and approximately one third of the weight of the mixture consists of the organic fibre, which polymer material then fills essentially all the tubular formations and areas around them with the polymer material, wherein essentially all the tubular formations act as a reinforcement, which then provides the boarding material with considerable strength in terms of bending and tensile strength and a high flexural stiffness.

3. A method according to claim 2, wherein the dye pigment constitutes approximately 2-3 per cent by weight of the mixture to provide an even dye distribution throughout the boarding material.

4. A method according to claim 1, wherein the processing into the granulates takes place so that the polymer material and the organic fibre are mixed together in a container and squeezed out of the container, they are directed at random towards a surface where they dry and harden in this form as coils, which bend in curves on and near each other, whereupon, when essentially dry, they are split into the granulates which form short cylindrical pieces which are approximately 3 mm in diameter and approximately 3 mm long and which have a plurality of tubular formations lying close together in each granulate, which tubular formations have openings which point towards and are exposed against the ends of the short cylindrical pieces, which openings, in this position, suck up the fluid polymer material containing the dye pigment quickly and effectively when they are fed into the extruder, where the tubular formations are then filled.

5. A method according to claim 1, wherein the heating device discharges energy in the second step in the form of IR beams which radiate towards the aged surface layer at a distance of approximately 1 to 5centimeters from it.

6. A method according to claim 5, wherein the heating device transmits IR beams which are created by at least two electrical coils located close together on the heating device, which coils supply current, wherein the IR beams are directed with an evenly distributed quantity of energy per unit of area directly towards the aged surface layer and indirectly via at least two reflecting reflectors arranged behind the electrical coils, which reflectors direct the reflecting IR beams in a direction straight towards the aged surface layer, which reflectors, in the second step, are guided with movements at a distance of approximately 1-5 cm from the surface layer to complete a third step.

7. A method according to claim 1, wherein the boarding material is selected from a group of boarding materials consisting of: boarding material used in a wall, boarding material used in a roof, or boarding material used in a fence.

8. A method according to claim 1, wherein the loose particles are selected from a group of loose particles consisting of: dirt, dust, or soot.

* * * * *